United States Patent
Du

(10) Patent No.: US 6,848,254 B2
(45) Date of Patent: Feb. 1, 2005

(54) METHOD AND APPARATUS FOR CONTROLLING A HYDRAULIC MOTOR

(75) Inventor: Hongliu Du, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 32 days.

(21) Appl. No.: 10/610,217

(22) Filed: Jun. 30, 2003

(65) Prior Publication Data

US 2004/0261407 A1 Dec. 30, 2004

(51) Int. Cl.$^7$ .............................................. F16D 31/02
(52) U.S. Cl. ........................................ 60/448; 60/452
(58) Field of Search .................................... 60/448, 452

(56) References Cited

U.S. PATENT DOCUMENTS

| | | |
|---|---|---|
| 3,631,763 A | 1/1972 | Court |
| 3,643,434 A | 2/1972 | Widmaier |
| 3,647,321 A | 3/1972 | Boydell |
| 3,665,814 A | 5/1972 | Ankeny |
| 3,738,779 A | 6/1973 | Hein et al. |
| 3,744,243 A | 7/1973 | Faisandier |
| 3,788,775 A | 1/1974 | Leutner et al. |
| 3,797,245 A | 3/1974 | Hein |
| 3,945,764 A | 3/1976 | Marietta |
| 3,976,098 A | 8/1976 | Raymond |
| 4,013,380 A | 3/1977 | Pensa |
| 4,028,010 A | 6/1977 | Hopkins |
| 4,097,196 A | 6/1978 | Habiger |
| 4,139,987 A | 2/1979 | Budzich |
| 4,212,596 A | 7/1980 | Ruseff |
| 4,399,653 A | 8/1983 | Pylat, Jr. |
| 4,474,104 A | 10/1984 | Creffield |
| 4,483,663 A | 11/1984 | Myers |
| 4,489,551 A | 12/1984 | Watanabe et al. |
| 4,510,750 A | 4/1985 | Izumi et al. |
| 4,553,904 A | 11/1985 | Ruseff et al. |
| 4,561,250 A | 12/1985 | Aoyagi et al. |
| 4,617,797 A | 10/1986 | Williams |
| 4,655,689 A | 4/1987 | Westveer et al. |
| 4,733,601 A | 3/1988 | Neirynck |
| 4,809,504 A | 3/1989 | Izumi et al. |
| 4,967,557 A | 11/1990 | Izumi et al. |
| 5,058,383 A | 10/1991 | Tsunemi et al. |
| 5,173,224 A | 12/1992 | Nakamura et al. |
| 5,183,393 A | 2/1993 | Schaffner |
| 5,207,060 A | 5/1993 | Sheets |
| H1191 H | 6/1993 | Huchison et al. |
| 5,222,870 A | 6/1993 | Budzich |
| 5,266,756 A | 11/1993 | Hatano |
| 5,295,795 A | 3/1994 | Yasuda et al. |
| 5,297,941 A | 3/1994 | Park |
| 5,325,288 A | 6/1994 | Satou |
| 5,331,541 A | 7/1994 | Ueda et al. |
| 5,384,526 A | 1/1995 | Bennett |
| 5,435,131 A | 7/1995 | Hausman et al. |

(List continued on next page.)

FOREIGN PATENT DOCUMENTS

| | | |
|---|---|---|
| EP | 0 610 940 A1 | 8/1994 |
| GB | 2291986 | 7/1996 |
| GB | 2 292 986 | 7/1996 |

OTHER PUBLICATIONS

Article written by T. Nishiumi & J. Watton of Cardiff School of Engineering, University of Wales, Cardiff: Model Refere, 1997.

*Primary Examiner*—Thomas E. Lazo
(74) *Attorney, Agent, or Firm*—D. James Barnes

(57) ABSTRACT

A method and apparatus for controlling the motor output speed of a variable displacement hydraulic motor are disclosed. The method may include determining a value indicative of a motor output speed, determining a value indicative of a desired motor output speed, determining a desired position of a control valve using a nonlinear feedback control law, and, controlling the motor output speed as a function of the control valve position, wherein the nonlinear feedback control creates a first order system response.

20 Claims, 5 Drawing Sheets

U.S. PATENT DOCUMENTS

| | | | |
|---|---|---|---|
| 5,439,355 A | | 8/1995 | Jimison et al. |
| 5,447,027 A | | 9/1995 | Ishikawa et al. |
| 5,497,653 A | | 3/1996 | Snow |
| 5,503,534 A | | 4/1996 | Rhody |
| 5,507,266 A | | 4/1996 | Wright et al. |
| 5,525,043 A | | 6/1996 | Lukich |
| 5,527,156 A | | 6/1996 | Song |
| 5,528,928 A | | 6/1996 | Baker et al. |
| 5,542,251 A | * | 8/1996 | Leibing et al. ............... 60/448 |
| 5,554,007 A | | 9/1996 | Watts |
| 5,563,351 A | | 10/1996 | Miller |
| 5,564,905 A | | 10/1996 | Manring |
| 5,567,123 A | | 10/1996 | Childress et al. |
| 5,588,805 A | | 12/1996 | Geringer |
| 5,646,539 A | | 7/1997 | Codina et al. |
| 5,654,504 A | | 8/1997 | Smith et al. |
| 5,666,806 A | | 9/1997 | Dietz |
| 5,697,764 A | | 12/1997 | Oda et al. |
| 5,720,598 A | | 2/1998 | de Chizzelle |
| 5,798,941 A | | 8/1998 | McLeister |
| 5,865,602 A | | 2/1999 | Nozari |
| 5,876,185 A | | 3/1999 | Schimpf et al. |
| 5,881,629 A | | 3/1999 | Gollner et al. |
| 5,903,215 A | | 5/1999 | Kanno |
| 5,944,492 A | | 8/1999 | Konishi et al. |
| 5,947,695 A | | 9/1999 | Nagaoka et al. |
| 5,960,695 A | | 10/1999 | Aardema et al. |
| 6,033,188 A | | 3/2000 | Baldus et al. |
| 6,048,177 A | | 4/2000 | Erkkilae et al. |
| 6,068,451 A | | 5/2000 | Uppal |
| 6,092,370 A | | 7/2000 | Tremoulet, Jr. et al. |
| 6,095,760 A | | 8/2000 | Houtman |
| 6,131,391 A | | 10/2000 | Poorman |
| 6,135,724 A | | 10/2000 | Yoder et al. |
| 6,152,702 A | | 11/2000 | Codina et al. |
| 6,179,570 B1 | | 1/2001 | Smith |
| 6,282,892 B1 | | 9/2001 | Arai |
| 6,302,653 B1 | | 10/2001 | Bryant et al. |
| 6,374,722 B1 | | 4/2002 | Du et al. |
| 6,375,433 B1 | | 4/2002 | Du et al. |
| 6,468,046 B1 | | 10/2002 | Du et al. |
| 2002/0176784 A1 | | 11/2002 | Du |

* cited by examiner

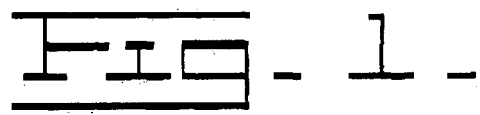
(PRIOR ART)
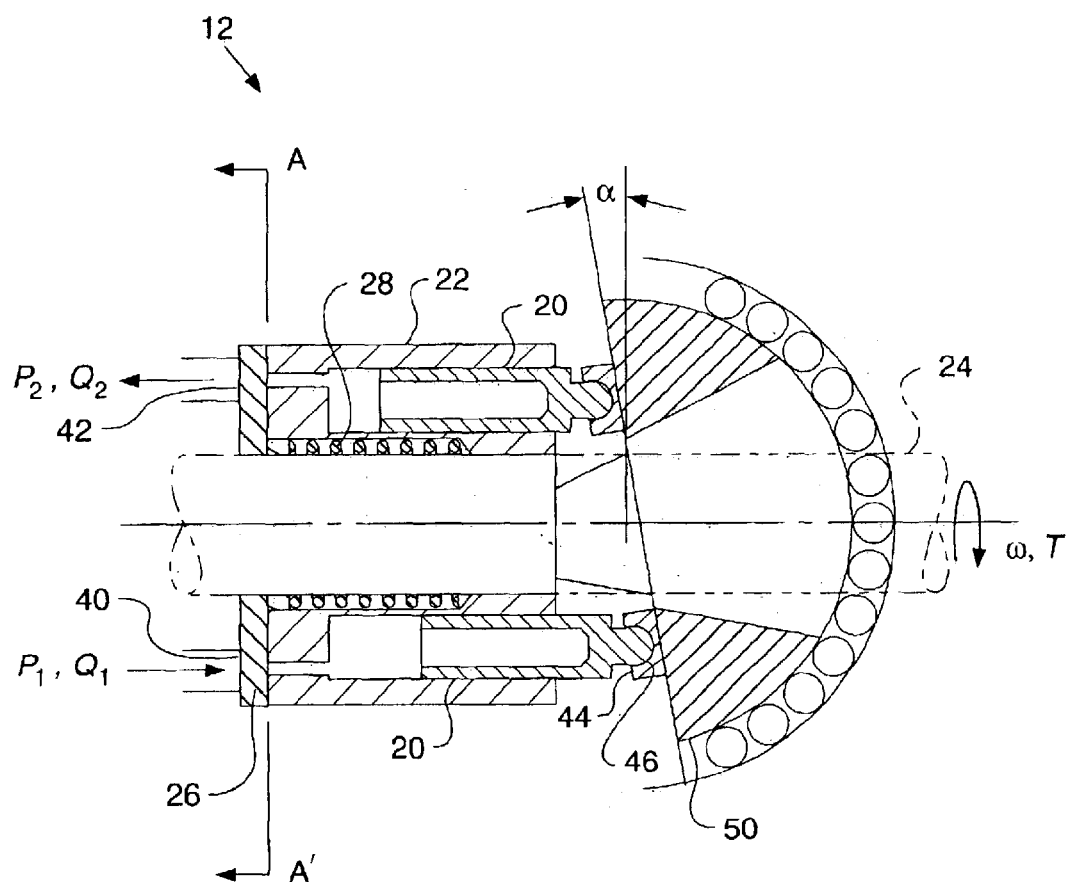

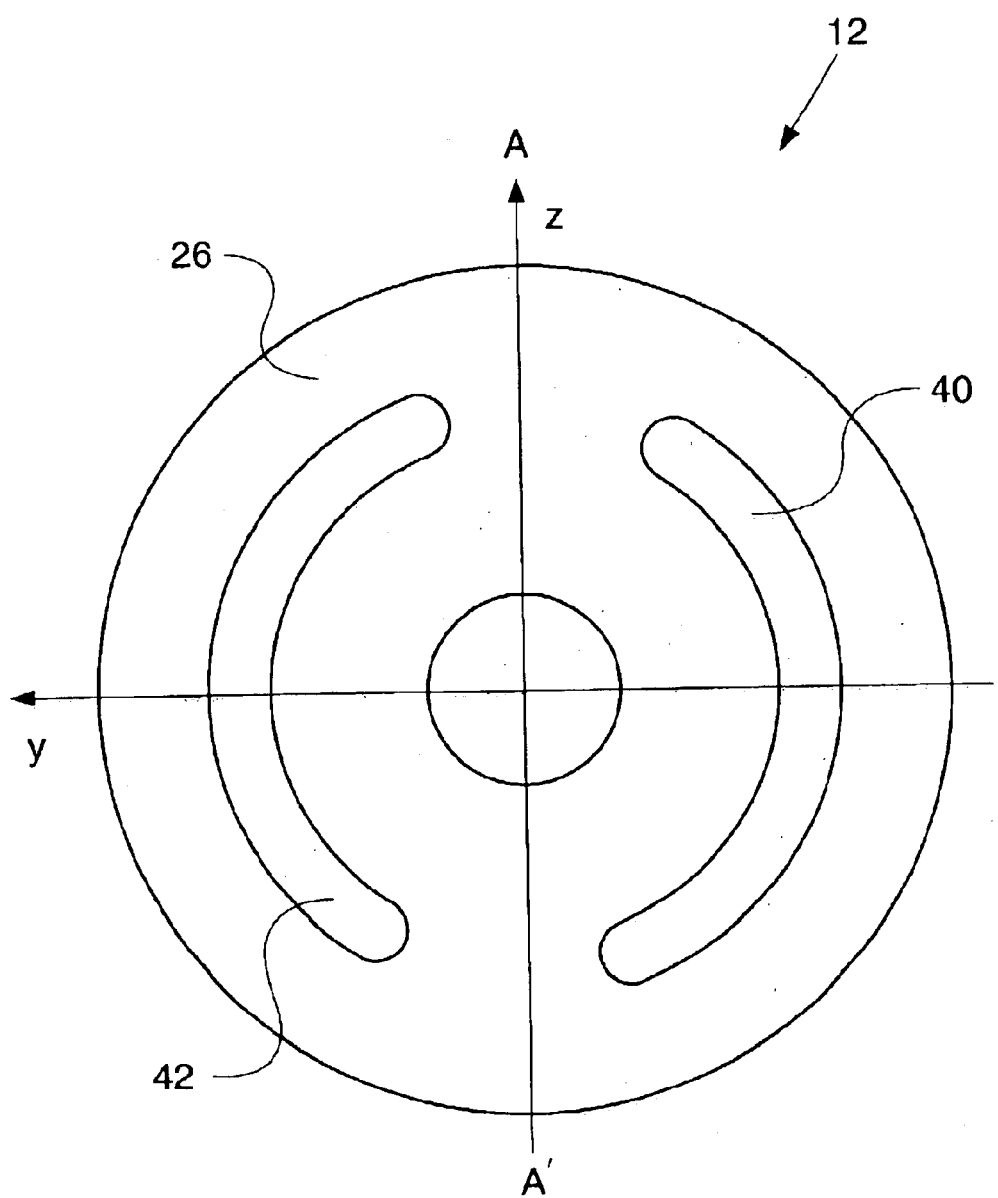
Fig_2_
(PRIOR ART)

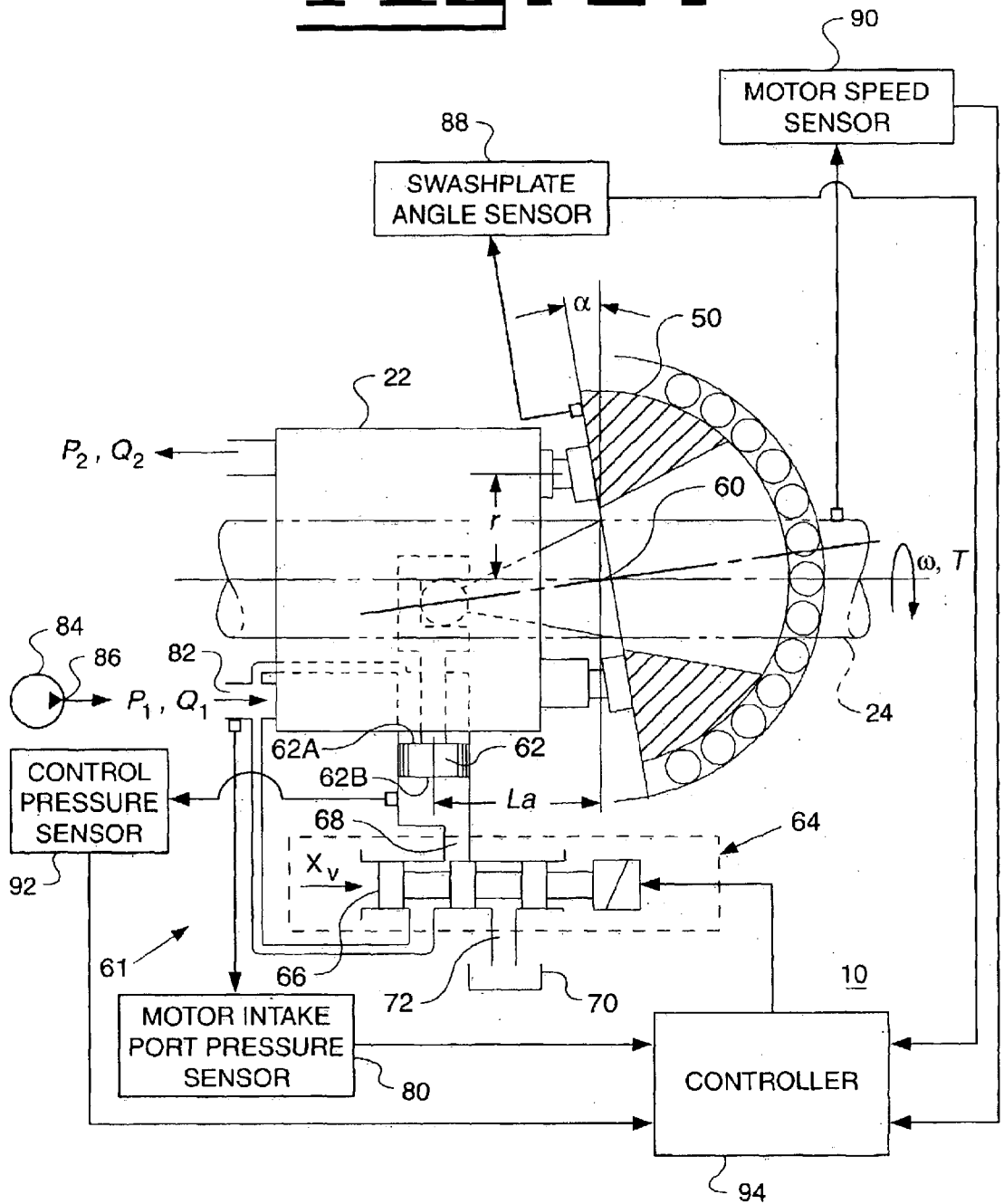

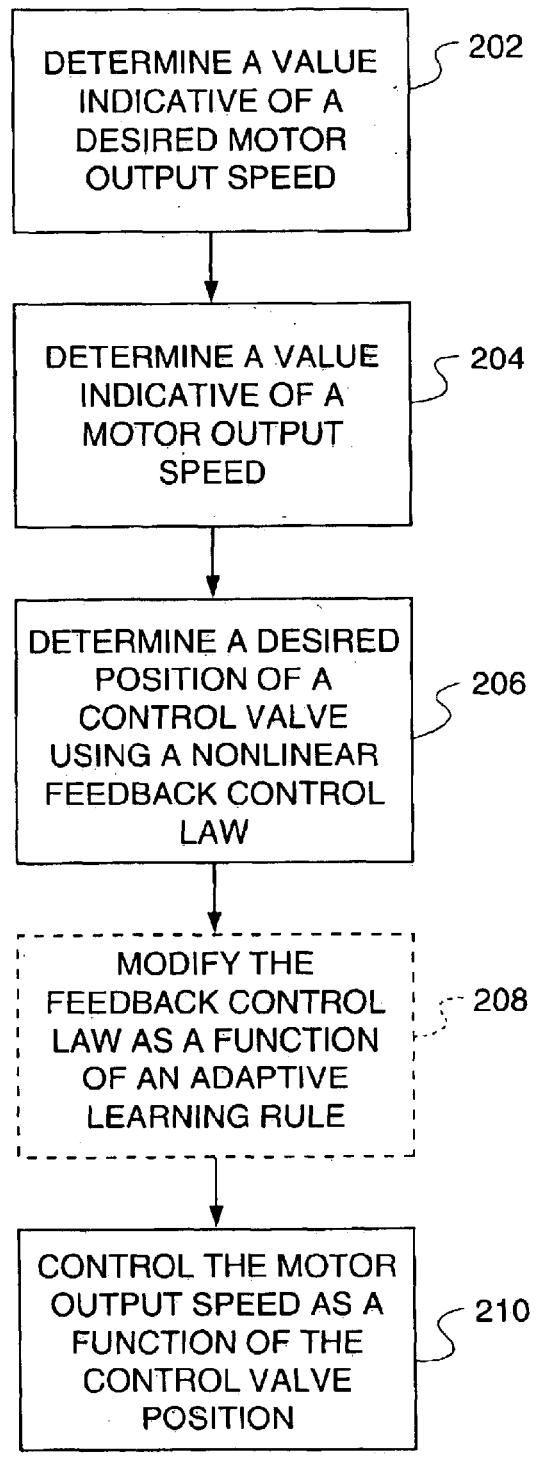
Fig_5_

METHOD AND APPARATUS FOR CONTROLLING A HYDRAULIC MOTOR

TECHNICAL FIELD

This invention relates generally to a method and apparatus for controlling a variable displacement hydraulic motor and, more particularly, to a method and apparatus for controlling the output speed of a variable displacement hydraulic motor.

BACKGROUND

Variable displacement hydraulic motors, such as hydraulic axial piston motors, are widely used on earthworking and construction machines, e.g., loaders, excavators, dozers, and the like. For example, a typical application may be found on track loaders. On these vehicles, a first variable displacement hydraulic motor may be used to drive a right-side track and a second variable displacement hydraulic motor may be used to drive a left-side track. To keep the vehicle moving in a straight line, the output speed of each hydraulic motor must be precisely controlled so that the right and left tracks move at substantially the same speed.

In many conventional applications, linear control systems, such as hydro-mechanical control systems, are used to control the output speed of variable displacement hydraulic motors. However, variable displacement hydraulic motors are inherently non-linear systems, and linear control systems tend to have limited stable operating ranges. In order to insure the stability of such a control system, small feedback gains must be used. Moreover, stability of the control system may become a critical issue when a wide range of operation is desired, for example when a desired motor output speed changes significantly and periodically. In addition, due to limited design flexibility, hydro-mechanical control systems tend to suffer from slow system response times, large overshoot, and high manufacturing costs. Further, adjustment of such control systems is often time consuming and costly.

Other electro-hydraulic (E/H) control methods exist which may be used to control systems having essentially nonlinear behavior. For example, one of the most common methods of control is to first linearize a nonlinear system and then control the resultant linearized system. A common example of such a method involves a Taylor Series linearization, which linearizes a small portion of the system about an operating point, the small portion being essentially linear in nature. One drawback of such a method is that predictable performance is assured only if the system stays close to the particular point about which the system linearized.

The present invention is directed to overcoming one or more of the problems set forth above.

SUMMARY OF THE INVENTION

According to one aspect of the invention, a method for controlling the motor output speed of a variable displacement hydraulic motor is provided. The method may include determining a value indicative of a motor output speed, determining a value indicative of a desired motor output speed, determining a desired position of a control valve using a nonlinear feedback control law, and controlling the motor output speed as a function of the control valve position, wherein the nonlinear feedback control law creates a first order system response.

According to another aspect of the invention, an apparatus for controlling an output speed of a variable displacement hydraulic motor is provided. The apparatus may include a swashplate movably mounted to the motor, a control actuator disposed in mechanical communication with the swashplate and configured and arranged to control an angle of the swashplate, a control valve disposed in hydraulic communication with the control actuator, and a speed sensor operably connected to an output portion of the motor and operable to determine an output speed of the motor. The apparatus may further include a controller electrically connected to the speed sensor and the control valve, the controller being operable to determine a desired position of the control valve using a nonlinear feedback control law and being further operable to control the valve to produce a first order system response.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings, FIG. 1 is a diagrammatic side profile cutaway view of a variable displacement hydraulic motor suitable for use with the present invention;

FIG. 2 is a diagrammatic end view of the porting side of the motor of FIG. 1;

FIG. 3 is a partial diagrammatic illustration and partial block diagram of a hydraulic motor and an exemplary control system for the hydraulic motor;

FIG. 5 is a flow diagram illustrating an exemplary method of the present invention.

Figure 4:
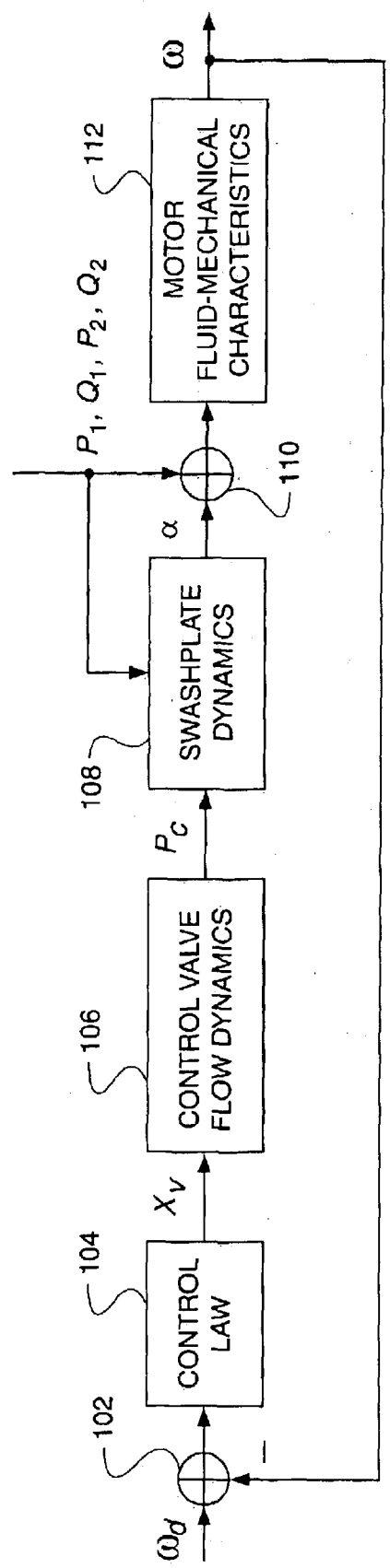
FIG. 4 is a feedback control diagram for the control system of FIG. 3.

Although the drawings represent one or more embodiments of the present invention, the drawings are not necessarily to scale, and certain features may be exaggerated in order to better illustrate and explain the present invention. The exemplifications set out herein illustrate exemplary embodiments of the invention and such exemplifications are not to be construed as limiting the scope of the invention in any manner.

DETAILED DESCRIPTION

Reference will now be made in detail to embodiments of the invention, examples of which are illustrated in the accompanying drawings. Wherever possible, the same or corresponding reference numbers will be used throughout the drawings to refer to the same or corresponding parts.

Referring to the drawings, a method and apparatus 10 for controlling the output speed of a variable displacement hydraulic motor 12 is disclosed.

With particular reference to FIGS. 1 and 2, the variable displacement hydraulic motor 12, hereinafter referred to as the motor 12, may be an axial piston swashplate hydraulic motor 12 having a plurality of pistons 20, e.g., nine, located in a circular array within a cylinder block 22. Preferably, the pistons 20 are spaced at equal intervals about an output shaft 24, which may be located at a longitudinal center axis of the block 22 and fixedly attached to the block 22. The cylinder block 22 is compressed tightly against a valve plate 26 by a cylinder block spring 28. The valve plate 26 includes an intake port 40 and a discharge port 42.

Each piston 20 is connected to a slipper 44, for example by a ball and socket joint 46. Each slipper 44 is maintained in contact with a swashplate 50. The swashplate 50 is movably mounted to the motor 12, the swashplate angle α being controllably adjustable.

With continued reference to FIGS. 1 and 2, operation of the motor 12 is illustrated. A high pressure fluid having an input pressure $P_1$ and input flow rate $Q_1$ flows into the motor 12 through the intake port 40. Inside the motor, fluid power is converted into mechanical energy, which is transferred to the cylinder block 22 and the output shaft 24 in the form of output speed and torque (ω, T). The fluid then exits the motor 12 through the discharge port 42 with a lower discharge pressure $P_2$ and a discharge flow rate $Q_2$.

More specifically, as each piston 20 passes over the intake port 40, the high pressure fluid forces the piston 20 to extend outwardly from the cylinder block 22 and against the swashplate 50. The tilt of the swashplate 50 relative to the piston displacement forces the piston 20 to move across the swashplate 50, thereby causing the cylinder block 22 and the output shaft 24 to rotate. As a result of this rotation, each piston 20 periodically passes over each of the intake and discharge ports 40, 42 of the valve plate 26. Thus, the pistons 20 undergo an oscillatory displacement in and out of the cylinder block 22, receiving hydraulic fluid through the high pressure intake port 40 and discharging fluid through the low pressure discharge port 42. In addition, the pistons 20 undergo a rotational displacement, thereby forcing the output shaft 24 to move with an angular velocity ω. Changes to the input pressure $P_1$ or the swashplate angle α may affect the angular velocity ω of the output shaft 24.

In the embodiment shown in FIG. 3, the swashplate 50 inclines about a swashplate pivot point 60 with a swashplate angle α and is controlled by a control assembly 61 having a control actuator 62 and a control valve 64. A first end 62A, for example a rod end, of the control actuator 62 is disposed in fluid communication with the high pressure fluid ($P_1$) and is biased by the high pressure fluid to increase the swashplate angle α, thus tending to increase the stroke of the motor 12. A second end 62B, for example a head end, of the control actuator 62 may be selectively exposed, by operation of the control valve 64, to the high pressure fluid ($P_1$) or to a tank 70 to control the position of the control actuator 62 and the swashplate angle α. In the embodiment of FIG. 3, the second end (hereinafter referred to as "head end 62B") of the control actuator 62 provides a larger effective surface area than the first end (hereinafter referred to as "rod end 62A"). Therefore, when the head end 62B is exposed to the high pressure fluid ($P_1$), the control actuator 62 operates to decrease the swashplate angle α, thus decreasing the stroke of the motor 12. It is noted that the swashplate 50 may be positioned with a positive swashplate angle α (as shown in FIG. 1) to rotate the shaft 24 in a first direction or with a negative swashplate angle α to rotate the shaft 24 in the opposite direction.

As in the embodiment shown in FIG. 3, the control valve 64 may be a three-way valve fluidly connected between the high pressure fluid and the head end 62B of the control actuator and having a control valve member 66 therein, such as a movable valve spool. The control valve member 66 may be controllably moved in position to direct flow of the high pressure fluid ($P_1$) through a port 68 and toward the head end 62B of the control actuator 62 to expose the head end 62B to the high pressure fluid. Conversely, the control valve member (hereinafter referred to as "valve spool 66") may be controllably moved in position to direct fluid away from the head end 62B through a port 72 and toward the tank 70.

Referring again to FIG. 3, a block diagram illustrating an embodiment of a control system 10 according to the present invention is shown.

A motor intake port pressure sensor 80, which may be located at the motor intake port 82, is adapted to sense the motor intake port pressure of the hydraulic fluid from a pressurized fluid supply source 84, such as a hydraulic pump. Alternatively, the motor intake port pressure sensor 80 may be located at any position suitable for sensing the pressure of the fluid at the motor intake port 82, such as at the discharge port 86 of the source 84, at a point along the hydraulic fluid line from the source 84, and the like. In a preferred embodiment, the motor intake port pressure sensor 80 is of a type well known in the art and suited for sensing pressure of hydraulic fluid.

A swashplate angle sensor 88, which may be located at the swashplate 50, is adapted to sense the tilt angle α of the swashplate 50. For example, the swashplate angle sensor 88 may be a Hall effect based rotary sensor or some other type of sensor well known in the art.

A motor speed sensor 90, which may be connected to an output portion of the motor 12 is adapted to sense the motor output speed w. For example, the motor speed sensor 90 may be connected to the output shaft 24. Alternatively, the motor speed sensor 90 may be connected to any member suitable for determining a value indicative of the motor output speed h, such as the cylinder block 22, a work tool (not shown) engaged with the output shaft 24, a transmission. (not shown), or the like.

A control pressure sensor 92 may be located at the control actuator 62 in a manner suitable for sensing the pressure of the hydraulic fluid being provided to the control actuator 62 by the control valve 64. Alternatively, the control pressure sensor 92 may be located at the control valve port 68.

A controller 94, which may include an electric current driver and data acquisition system, may be located on a machine (not shown) that uses the motor 12 as part of an overall hydraulic system, for example a mobile construction or earthworking machine. The controller 94 may be electrically connected with the motor 12 and may be adapted to receive the sensed information from the motor intake port pressure sensor 80, the swashplate angle sensor 88, the motor speed sensor 90, the control pressure sensor 92, and any other appropriate sensor. The controller 94 may be adapted to responsively perform one or more functions to control the output speed of the motor 12 in a desired manner. More specifically, the controller 94 may be adapted to determine a desired control valve position using a nonlinear feedback control law and to control the motor output speed as a function of the control valve position. The feedback control law may be operable to create a first order system response. It should be appreciated that the term electrically connected includes, but is not limited to, a hard-wired electrical connection as well as an electrical communication established remotely between the devices, such as by infrared signals, RF signals, or the like.

Operation of the controller 94 is discussed in greater detail below.

Referring to FIG. 4, a feedback control diagram representative of an exemplary embodiment of the present invention is shown.

A value indicative of a desired motor output speed $\omega_d$ is input into a first junction 102, which also receives feedback regarding the sensed motor output speed ω.

The output of the first junction 102 is delivered to a nonlinear control law 104 to determine a desired position $x_v$, for the valve spool 66. It is noted that the desired position $x_v$ should result in a corresponding desired motor intake port pressure $P_{1,d}$, a desired swashplate angle $\alpha_d$, and ultimately a desired output speed $\omega_d$. The nonlinear feedback control law 104 may be represented by an exemplary equation of the form:

$$x_v = -\frac{kA_hL_\alpha(\Delta P_1\omega - P_1\Delta\omega) + A_hL_\alpha\dot{\alpha}_d}{C_dw\sqrt{\frac{2}{\rho}\left(\frac{P_1 + sgn(x_v)P_1}{2} - sgn(x_v)P_c\right)}} \quad \text{(Eq. 1)}$$

where:

$A_h$ is a gain constant that is greater than zero;

$A_h$ is the area of the head end 62B of the control actuator 62;

$L_\alpha$ is the distance from the control actuator 62 to the pivot point 60;

$P_1$ is the motor intake port pressure;

$\Delta P_1$ is the difference between the desired motor intake port pressure and the actual intake port pressure;

$\omega$ is the motor output speed;

$\Delta\omega$ is the difference between the desired motor output speed and the actual motor output speed;

$\dot{\alpha}_d$ is the desired angular velocity of the swashplate;

$C_d$ is a valve orifice coefficient for the valve spool;

w is a control valve area gradient, which can be approximated by evaluating the derivative of the area of the valve orifice at zero position;

$\rho$ is the density of the hydraulic fluid; and $P_c$ is the control pressure, i.e., the pressure applied to the head end 62B of the control actuator 62.

It is noted that the control law of Eq. 1 will result in a stable, convergent, nonlinear first order dynamic system response, and that overshoot of the motor output speed is, therefore, substantially eliminated thereby. The error dynamics of Eq. 1 may be expressed as:

$$k(\Delta P_1\omega - P_1\Delta\omega) + \Delta\dot{\alpha} = 0 \quad \text{(Eq. 2)}$$

It should be appreciated that Eq. 1 is representative of an exemplary control law 104, and that variations of the control law 104 may be used without deviating from the scope of the present invention.

The control law 104 presented as Eq. 1 above is a function of the control pressure $P_c$, which in some circumstances may not be desirable to measure, and $\Delta P_1$, which may not be available. As one alternative to Eq. I, a simplified control law 104 may be determined using a quasi-static control method, wherein a steady-state value of the control pressure $P_c$ may be approximated based on system dynamics and measured parameters, and a determination of $\Delta P_1$ may be approximated using similar considerations. Thus, a simplified control law 104 using the quasi-static control method may be represented by:

$$x_v \approx \frac{A_hL_\alpha\omega_d\dot{\omega}_d + (k_p\omega_d - A_hL_\alpha\dot{\omega}_d)\Delta\omega}{C_dw\omega_d^2\sqrt{\frac{1}{\rho}\left(1 + sgn(x_v)\left(1 - \frac{rnA_p\gamma}{\pi A_hL_\alpha}\right)\right)\sqrt{P_1}}}\alpha \quad \text{(Eq. 3)}$$

where:

$\omega_d$ is the desired motor output speed;

$\dot{\omega}_d$ is the desired motor output speed acceleration;

$k_p$ is a gain constant that is greater than zero;

$\alpha$ is the swashplate angle;

r is the radius of a piston pitch circle;

n is the number of pistons;

$A_p$ is the sectional area of a motor piston; and y is the pressure carry over angle.

The output from the control law 104 is used by the controller 94 to control the position of the control valve 64. For example, the control valve 64 may be an electro-hydraulic valve, and the controller 94 may communicate a control signal to the control valve 64 as a function of the control law 104. Controlling the position of the control valve may affect the control valve flow dynamics to produce a control pressure $P_c$ at the head end 62B of the control actuator 62, as indicated at 106 in FIG. 4. The control pressure $P_c$, in combination with various swashplate dynamics—such as nonlinear friction on the swashplate 50, Coulomb friction between each piston 20 and the cylinder block 22, the input flow pressure and flow rate $P_1$, $Q_1$, and the like—acts to produce a swashplate angle $\alpha$, as indicated at 108 in FIG. 4. At junction 110, the swashplate angle $\alpha$, in combination with the input pressure and flow rate $P_1$, $Q_1$ and the discharge pressure and flow rate $P_2$, $Q_2$, affects the fluid-mechanical characteristics of the motor 12 to produce a motor output speed $\omega$, as indicated at 112 in FIG. 4.

Referring to FIG. 5, a flow diagram illustrating one method according to the present invention is shown.

In a first control block 202, a value indicative of a desired motor output speed $\omega_d$ is determined. It should be appreciated that the desired motor output speed $\omega_d$ may be determined in a variety of ways. For example, the desired motor output speed $\omega_d$ may be determined by an operator in real time and transmitted to the controller 94 via a joystick or other control mechanism known in the art; determined as a function of a control process; predetermined during programming or adjusting of the controller 94 or operating machine; or may be determined in a variety of alternative ways known in the art.

In a second control block 204, a value indicative of a motor output speed $\omega$ is determined, for example by using the motor speed sensor 90 shown in FIG. 3. In addition a value of a motor intake port pressure $P_1$ may be determined, for example by using the motor intake port pressure sensor 80 shown in FIG. 3; and a value of a swashplate angle $\alpha$ may be determined, for example by using the swashplate angle sensor 88 shown in FIG. 3. Further, in the embodiment described with relation to Eq. 1, the control pressure $P_c$ may be determined, for example using the control pressure sensor 92 shown in FIG. 3.

In a third control block 206, a desired position $x_v$ of the control valve may be determined using the nonlinear feedback control law 104.

In an optional fourth control block 208, an adaptive learning rule may be introduced into the control law 104, for example during operation of the motor 12, to compensate for system parameter uncertainties. Thus, the feedback control law 104 may be modified as a function of the adaptive learning rule. An exemplary adaptive learning rule 302 for modifying the feedback control law 104 is shown below:

$$k_\alpha \frac{(\alpha\Delta\omega - \omega_d\alpha)\omega_d}{\omega_d^2\sqrt{P_1}} \quad \text{(Eq. 4)}$$

where $k_\alpha$ is an adaptive gain term that may be adaptively changed over time.

Thus, the adaptive learning rule 302 may be applied to the control law 104 to produce the following exemplary modified control law 104:

$$x_v \approx \frac{\hat{A}_h \hat{L}_a \omega_d \dot{\omega}_d + (k_p \omega_d - \hat{A}_h \hat{L}_a \dot{\omega}_d)\Delta\omega}{\hat{C}_d \hat{w} \omega_d^2 \sqrt{\frac{1}{\rho}\left(1 + sgn(x_v)\left(1 - \frac{rn\hat{A}_p \hat{\gamma}}{\pi \hat{A}_h \hat{L}_a}\right)\right)} \sqrt{P_1}} \alpha + \quad \text{(Eq. 5)}$$

$$k_a \frac{(\alpha\Delta\omega - \omega_d \alpha)\dot{\omega}_d}{\omega_d^2 \sqrt{P_1}}$$

where the adaptation gain of $k_a$ is:

$$\dot{k}_a = -\eta \Delta\alpha \frac{\dot{\alpha}_d}{\sqrt{P_1}} \quad \text{(Eq. 6)}$$

and where:

$\eta$ is a positive number indicative of a learning rate; and $\hat{\ }$ indicates that the term is an estimated term.

It is noted that the adaptive learning rule of Eq. 4 compensates for various uncertainties in the system parameters, which may change over time. It should be appreciated that the adaptive learning rule of Eq. 4 is representative of an exemplary adaptive learning rule 302, and that variations of the adaptive learning rule 302 may be used without deviating from the scope of the present invention.

In a fifth control block 210, the output speed ω of the motor is controlled as a function of the control valve position $x_v$.

INDUSTRIAL APPLICABILITY

The present invention may be used, for example, to improve control of the output speed ω of a variable displacement hydraulic motor 12. An exemplary use of such a motor 12 may be found on an earthworking machine, such as a loading machine having two drive tracks. On such a machine, two hydraulic variable displacement pumps 12, each powered by a variable displacement hydraulic pump, may be used to provide torque and speed to the machine's drive tracks. During operation of the machine an operator may desire to drive, for example, in a straight line, thus requiring the output speed of the motors to be controlled precisely, especially at low operating speeds. However, as the machine is moved across a terrain, various conditions, such as hills or path obstructions, may operate, in conjunction with machine/motor components and dynamics, to create nonlinearities in operation. As discussed above, typical linear, hydro-mechanical control systems may therefore provide inadequate or unreliable control of the motors.

The present invention is adapted to control the output speed of a variable displacement hydraulic motor 12 by using a nonlinear feedback control law that creates a first order system response and, optionally, an adaptive learning rule. Thus, variable displacement hydraulic motors may be more closely and reliably controlled in spite of their fundamentally nonlinear operation characteristics.

From the foregoing it will be appreciated that, although one or more specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and examples be considered as exemplary only, with a true scope and spirit of the invention being indicated by the following claims and their equivalents. Accordingly, the invention is not limited except as by the appended claims.

What is claimed is:

1. A method for controlling a motor output speed of a variable displacement hydraulic motor, the method comprising the steps of:

determining a value indicative of a motor output speed;

determining a value indicative of a desired motor output speed;

determining a desired position of a control valve using a nonlinear feedback control law; and controlling the motor output speed as a function of the control valve position, wherein the nonlinear feedback control law creates a first order system response.

2. The method of claim 1, wherein the step of determining a desired position of a control valve includes determining a desired position of a three-way valve member.

3. The method of claim 1, further comprising:

changing a control pressure as a function of determining the desired position of the control valve; and changing the orientation of a swashplate as a function of changing the control pressure.

4. The method of claim 1, wherein the nonlinear feedback control law includes a swashplate angle; and the method further comprises determining a value of a swashplate angle.

5. The method of claim 4, wherein the nonlinear feedback control law includes a motor input pressure; and the method further comprises determining a value of a motor input pressure.

6. The method of claim 1, further including modifying the feedback control law as a function of an adaptive learning rule.

7. The method of claim 6, wherein the adaptive learning rule includes a motor output speed.

8. The method of claim 7, wherein the adaptive learning rule includes a swashplate angle.

9. The method of claim 8, wherein the adaptive learning rule includes a motor input pressure.

10. The method of claim 1, wherein the step of determining a desired position of a control valve using a nonlinear feedback control law includes using a quasi-static control method to approximate one or more operating parameters of the motor.

11. An apparatus for controlling an output speed of a variable displacement hydraulic motor, the apparatus comprising:

a swashplate movably mounted to the motor;

a control actuator disposed in mechanical communication with the swashplate and configured and arranged to control an angle of the swashplate;

a control valve disposed in hydraulic communication with the control actuator;

a speed sensor operably connected to an output portion of the motor and operable to determine an output speed of the motor; and a controller electrically connected to the speed sensor and the control valve and operable to determine a desired position of the control valve using a nonlinear feedback control law and operable to control the valve to produce a first order system response.

12. The apparatus of claim 11, further including a swashplate angle sensor connected to the swashplate;
wherein:
the controller is electrically connected to the swashplate angle sensor; and
the nonlinear feedback control law includes the swashplate angle.

13. The apparatus of claim 12, further including a pressure sensor connected to the motor and operable to sense a motor input pressure;
wherein:
the controller is electrically connected to the pressure sensor; and
the nonlinear feedback control law includes the motor input pressure.

14. The apparatus of claim 11, further comprising a pressurized fluid supply;
wherein:
the control valve is hydraulically connected between the pressurized fluid supply and the control actuator;
the controller is operable to control the flow of pressurized fluid to the control actuator as a function of the position of the control valve; and
the control actuator is operable to change the angle of the swashplate in response to receiving pressurized fluid from the control valve.

15. The apparatus of claim 14, wherein the pressurized fluid supply is communicated to an input port of the motor.

16. The apparatus of claim 14, wherein:
the control actuator has a first end and a second end;
pressurized fluid from the pressurized fluid supply is communicated to the first end of the control actuator; and
the control valve is disposed between the pressurized fluid supply and the second end of the control actuator and is operable to communicate pressurized fluid to the second end of the control actuator.

17. The apparatus of claim 11, wherein the controller is operable to modify the nonlinear feedback control law as a function of an adaptive learning rule.

18. The apparatus of claim 11, wherein the control valve is an electro-hydraulic control valve.

19. The apparatus of claim 18, wherein the controller is electrically connected with the control valve and is operable to communicate a control signal to the control valve as a function of the control law.

20. The apparatus of claim 11, wherein the control valve is a three-way control valve.

* * * * *